Nov. 6, 1928.

E. BEST ET AL 1,690,525

CULTIVATOR

Filed Aug. 31, 1927

Inventor

E. Best
L. R. Vines

By Lacey & Lacey, Attorneys

Patented Nov. 6, 1928.

1,690,525

UNITED STATES PATENT OFFICE.

ED. BEST, OF APPLETON, AND LEWIS R. VINES, OF LORETTO, TENNESSEE, ASSIGNORS OF ONE-THIRD TO J. N. GUTHREY, OF TENNESSEE.

CULTIVATOR.

Application filed August 31, 1927. Serial No. 216,736.

This invention has for its object the provision of a simple and inexpensive device which may be easily secured to a cultivator beam and adjusted to turn the dirt either toward or from a row of plants as may be desired, and a further object of the invention is to provide simple means whereby the blades or ground-engaging elements may be firmly held in a set position. The invention is illustrated in the accompanying drawing and will be hereinafter fully set forth.

Figure 1:
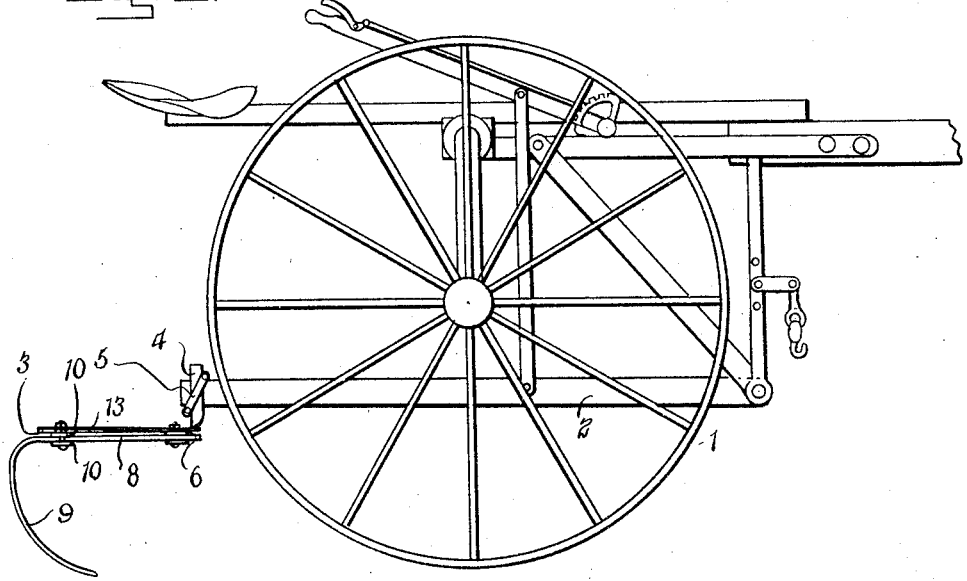
Figure 1 is a side elevation of a cultivator having our attachment applied thereto.

The cultivator 1 may be of any approved type having cultivator beams 2 which are arranged to run at opposite sides of a row of plants when the machine is in use.

In carrying out the present invention, there is provided a supplemental beam 3 having its front end upturned to provide a standard or post 4 which may be readily secured to the cultivator beam 2 in any desired manner, as by a clamp 5. There is also provided a front cross bar 6 which is pivotally attached to the auxiliary beam 3 near the front end of the same by a bolt 7 which will permit the cross bar to be set in any desired angular relation to the beam. At opposite sides of the beam and spaced equi-distantly along the cross bar the forwardly extending members 8 of ground-engaging elements are pivotally attached to the cross bar, and these members 8 are preferably formed integral with spring teeth or blades 9 which depend from their rear ends and are adapted to run along the surface of the ground to loosen the soil and turn the same aside in an obvious manner. The rear portions of the upper members 8 of the ground-engaging elements pass between upper and lower cross bars 10 and are free to move laterally relative to the said cross bars, the cross bars being secured together by a plurality of bolts 11 each of which is disposed beyond the sides of the ground-engaging elements. A bolt 12 is also provided and inserted through the rear end of the auxiliary beam 3 and through the cross bars 10 so that the said cross bars will be carried by the beam. There is also provided a locking brace 13 which has its rear end held by the bolt 12 and provided with a longitudinal series of openings 14 through any one of which said bolt 12 may be inserted to secure the brace in a set position relative to the front cross bar 6 and the ground-engaging elements, the front end of the brace being held by a bolt which pivotally secures one of the members 8 to the cross bar 6.

Figure 2:
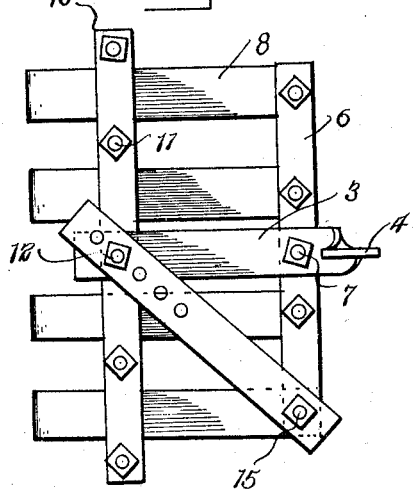
Fig. 2 is a plan view of the attachment removed from the cultivator and showing the blades arranged to run in a line at a right angle to the line of draft.
Figure 3:
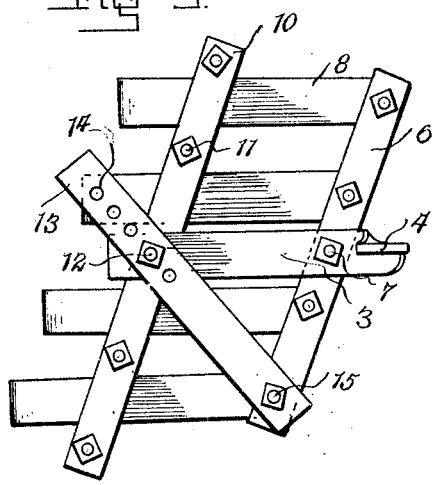
Fig. 3 is a view similar to Fig. 2 but showing the blades in a different set position.

It will be understood that two gangs of implements 9 will be provided, one gang being attached to the rear end of each cultivator beam 2 so that as the machine is drawn over the field the gangs will run at the opposite sides of a row of plants to cultivate the ground immediately adjacent the same. The machine may be used to create a mulch prior to planting and when so employed the device will be arranged as shown in Fig. 2, in which the implements 9 are arranged in a straight line at a right angle to the line of travel so as to cut through the surface soil and pulverize the same. When cultivating at the side of a row of plants, the implements 9 may be set, as shown in Fig. 3, and the gangs at the opposite sides of the row of plants will, of course, be reversely adjusted relative to each other so that if the apex of the angle defined by the two gangs is presented rearwardly the loose soil will be turned toward the plants but if the apex of said angle be directed forwardly the soil will be turned away from the plants. To set the ground-engaging elements in the obliquely disposed angular positions, the bolt 12 is loosened and the cross bars 6 and 10 swung pivotally upon their connections with the auxiliary beam 3 so that, while they will retain their parallel relation, the point of contact between the elements and the soil will be disposed obliquely relative to the line of draft. The several ground-engaging implements will turn pivotally with respect to the front cross bar 6 but will slide relative to the rear cross bars 10 so that the bolts 11, connecting the rear cross bars, need not be disturbed. After the desired adjustment has been effected, the bolt 12 is tightened in the opening 14 in which it may then be set so that the locking brace 13 will be rigidly held and movement of the cross bars relative to each other and to the auxiliary beam will be prevented, the ground-engaging elements being consequently held fixed in the position to which they are adjusted.

It will be seen that our attachment is exceedingly simple in construction and the arrangement of its parts and may be very easily adjusted and when adjusted will be securely held in its adjusted position. The attachment may be applied to any cultivator and may be easily removed so that other implements may be substituted therefor as occasion may demand.

Having thus described the invention, we claim:

1. An attachment for cultivators comprising an auxiliary beam, means for securing said beam to a cultivator beam, cross bars pivotally attached to the auxiliary beam, a plurality of ground-engaging elements each pivotally attached to the front cross bar and loosely freely supported by the rear cross bar, and a locking brace pivotally attached to the auxiliary beam adjacent the rear end thereof and pivoted to the front cross bar at one side of the auxiliary beam.

2. An attachment for cultivators comprising an auxiliary beam, means for securing the auxiliary beam to a cultivator beam, a front cross bar pivotally attached to the auxiliary beam and extending laterally therefrom, a pair of cross bars pivotally attached to the auxiliary beam near the rear end of the same and disposed one above the other, a plurality of ground-engaging implements each pivotally attached at its front end to the front cross bar and having its rear end portion supported freely by and between the rear cross bars, and a locking brace pivotally attached at its front end to the auxiliary beam and provided in its rear end portion with a plurality of openings to be selectively engaged with the pivotal connection between the rear cross bars and one of the ground-engaging implements whereby to lock the implements in a set position.

In testimony whereof we affix our signatures.

LEWIS R. VINES. [L. S.]
ED. BEST. [L. S.]